US012106777B2

(12) United States Patent
Hu

(10) Patent No.: US 12,106,777 B2
(45) Date of Patent: Oct. 1, 2024

(54) AUDIO PROCESSING METHOD AND ELECTRONIC DEVICE

(71) Applicant: VIVO MOBILE COMMUNICATION CO., LTD., Guangdong (CN)

(72) Inventor: Jixiang Hu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 113 days.

(21) Appl. No.: 17/940,057

(22) Filed: Sep. 8, 2022

(65) Prior Publication Data

US 2023/0005506 A1 Jan. 5, 2023

Related U.S. Application Data

(63) Continuation of application No. PCT/CN2021/079144, filed on Mar. 4, 2021.

(30) Foreign Application Priority Data

Mar. 11, 2020 (CN) .......................... 202010167788.0

(51) Int. Cl.
*G11B 27/02* (2006.01)
*G06F 3/16* (2006.01)
(Continued)

(52) U.S. Cl.
CPC .............. *G11B 27/02* (2013.01); *G06F 3/165* (2013.01); *G06F 40/166* (2020.01); *G10L 25/57* (2013.01)

(58) Field of Classification Search
CPC ....... G11B 27/02; G06F 40/166; G06F 3/165; G10L 25/57
See application file for complete search history.

(56) References Cited

U.S. PATENT DOCUMENTS 6,785,649 B1 * 8/2004 Hoory ..................... G10L 13/08
704/235
9,185,225 B1 11/2015 Vance
(Continued)

FOREIGN PATENT DOCUMENTS

CN 202502737 U 10/2012
CN 104135628 A 11/2014
(Continued)

OTHER PUBLICATIONS

International Patent Application No. PCT/CN2021/079144, International Search Report and Written Opinion with Partial English Machine Translation mailed May 28, 2021, 10 pages.
(Continued)

*Primary Examiner* — Mishawn N. Hunter
(74) *Attorney, Agent, or Firm* — Fredrikson & Byron, P.A.

(57) ABSTRACT

Embodiments of the present disclosure provide an audio processing method and an electronic device. The method includes: first obtaining text information corresponding to a to-be-processed audio, where the text information includes a to-be-processed text and a playback period corresponding to each field in the to-be-processed text; then receiving a first input on the to-be-processed text; in response to the first input, determining, as a to-be-processed field, a field indicated by the first input in the to-be-processed text; then receiving a second input on the to-be-processed field; obtaining a target audio segment in response to the second input; and finally modifying an audio segment at a playback period corresponding to the to-be-processed field according to the target audio segment, to obtain a target audio.

18 Claims, 8 Drawing Sheets

(51) Int. Cl.
G06F 40/166 (2020.01)
G10L 25/57 (2013.01)

(56) References Cited

U.S. PATENT DOCUMENTS

| | | | |
|---|---|---|---|
| 2008/0177536 | A1 | 7/2008 | Sherwani et al. |
| 2008/0275700 | A1* | 11/2008 | Bingley ................ G10L 15/26 704/235 |
| 2018/0095713 | A1* | 4/2018 | Rubin ................ G06Q 10/101 |

FOREIGN PATENT DOCUMENTS

| | | | |
|---|---|---|---|
| CN | 107633850 | A | 1/2018 |
| CN | 108984788 | A | 12/2018 |
| CN | 111445927 | A | 7/2020 |
| CN | 112102841 | A | 12/2020 |

OTHER PUBLICATIONS

European Patent Office, "Extended European Search Report", From Application No. 21767696.4, Dated May 19, 2023, pp. 1-8.

\* cited by examiner

Lyrics
It was more than the beer last night that made me shed tears
It was more than your gentle breathe I can't give it away
So long I will hold your hand and walk you down into the rain
Then I was confused by the freedom in my vein
Some day we will celebrate goodbyes in memories
A kiss from the willow twig, the green turns into gray
How can I forget the town in which we used to meet

FIG. 2-2

It was more than the beer last night that made me shed tears

FIG. 2-3

AUDIO PROCESSING METHOD AND ELECTRONIC DEVICE

CROSS-REFERENCE TO RELATED APPLICATIONS

This application is a continuation of International Application No. PCT/CN2021/079144, filed on Mar. 4, 2021, which claims priority to Chinese Patent Application No. 202010167788.0, filed on Mar. 11, 2020 in China, which are incorporated herein by reference in their entireties.

TECHNICAL FIELD

The present disclosure relates to the field of communications technologies, and in particular, to an audio processing method and an electronic device.

BACKGROUND

In life, people often record audio, but there are problems such as a slip of the tongue and a pet phrase during the recording. In this case, audio content needs to be modified, and an unwanted segment needs to be deleted.

In a conventional technology, a user usually manually adjusts a progress bar of the audio to find a playback period of an audio segment that needs to be modified, and then modifies the audio segment at the playback period. In an operation process, the user often needs to repeatedly adjust the progress bar to accurately locate the playback period of the audio segment that needs to be modified. Consequently, the entire operation process is relatively cumbersome, and audio processing efficiency is relatively low.

SUMMARY

Embodiments of the present disclosure provide an audio processing method and an electronic device.

According to a first aspect of the present disclosure, an audio processing method. The method is applied to an electronic device is provided, which includes:
- obtaining text information corresponding to a to-be-processed audio, where the text information includes a to-be-processed text and a playback period corresponding to each field in the to-be-processed text;
- receiving a first input on the to-be-processed text;
- in response to the first input, determining a to-be-processed field in the to-be-processed text according to a field indicated by the first input;
- receiving a second input on the to-be-processed field;
- obtaining a target audio segment according to the second input; and
- modifying an audio segment at a playback period corresponding to the to-be-processed field according to the target audio segment, to obtain a target audio.

According to a second aspect of the present disclosure, an electronic device is provided, which includes:
- a first obtaining module, configured to obtain text information corresponding to a to-be-processed audio, where the text information includes a to-be-processed text and a playback period corresponding to each field in the to-be-processed text;
- a first receiving module, configured to receive a first input on the to-be-processed text;
- a first determining module, configured to: in response to the first input, determine a to-be-processed field in the to-be-processed text according to a field indicated by the first input;
- a second receiving module, configured to receive a second input on the to-be-processed field;
- a second obtaining module, configured to obtain a target audio segment according to the second input; and
- a second determining module, configured to modify an audio segment at a playback period corresponding to the to-be-processed field according to the target audio segment, to obtain a target audio.

According to a third aspect of the present disclosure, an electronic device is provided, which includes a processor, a memory, and an audio processing program that is stored in the memory and that can be run on the processor, and when the audio processing program is executed by the processor, the steps of the audio processing method in the first aspect are implemented.

According to a fourth aspect of the present disclosure, a computer-readable storage medium is provided, where the computer-readable storage medium stores an audio processing program, and when the audio processing program is executed by a processor, the steps of the audio processing method in the first aspect are implemented.

In view of the above, according to the audio processing method and the electronic device provided in the embodiments of the present disclosure, text information corresponding to a to-be-processed audio is obtained, where the text information includes a to-be-processed text and a playback period corresponding to each field in the to-be-processed text; then a first input on the to-be-processed text is received; in response to the first input, a field indicated by the first input in the to-be-processed text is determined as a to-be-processed field; then a second input on the to-be-processed field is received; a target audio segment is obtained in response to the second input; and finally an audio segment at a playback period corresponding to the to-be-processed field is modified according to the target audio segment, to obtain a target audio.

BRIEF DESCRIPTION OF DRAWINGS

To describe the technical solutions in the embodiments of the present disclosure more clearly, the following briefly introduces the accompanying drawings required for describing the embodiments of the present disclosure. Apparently, the accompanying drawings in the following description show merely some embodiments of the present disclosure, and a person of ordinary skill in the art may obtain other accompanying drawings from these accompanying drawings without creative efforts.

FIG. 2-1 is a step flowchart of another embodiment of an audio processing method according to the present disclosure;

FIG. 2-2 is a schematic diagram of an example of displaying a to-be-processed text according to an embodiment of the present disclosure;

FIG. 2-3 is a schematic diagram of another example of displaying a to-be-processed text according to an embodiment of the present disclosure;

FIG. 2-4 is a schematic diagram of an example of editing a to-be-processed text according to an embodiment of the present disclosure;

FIG. 2-5 is a schematic diagram of another example of editing a to-be-processed text according to an embodiment of the present disclosure;

FIG. 2-6 is a schematic diagram of still another example of editing a to-be-processed text according to an embodiment of the present disclosure;

FIG. 3 is a step flowchart of still another embodiment of an audio processing method according to the present disclosure;

FIG. 4 is a structural block diagram of an embodiment of an electronic device according to the present disclosure; and FIG. 5 is a schematic diagram of a hardware structure of an embodiment of an electronic device according to the present disclosure.

DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Figure 1:
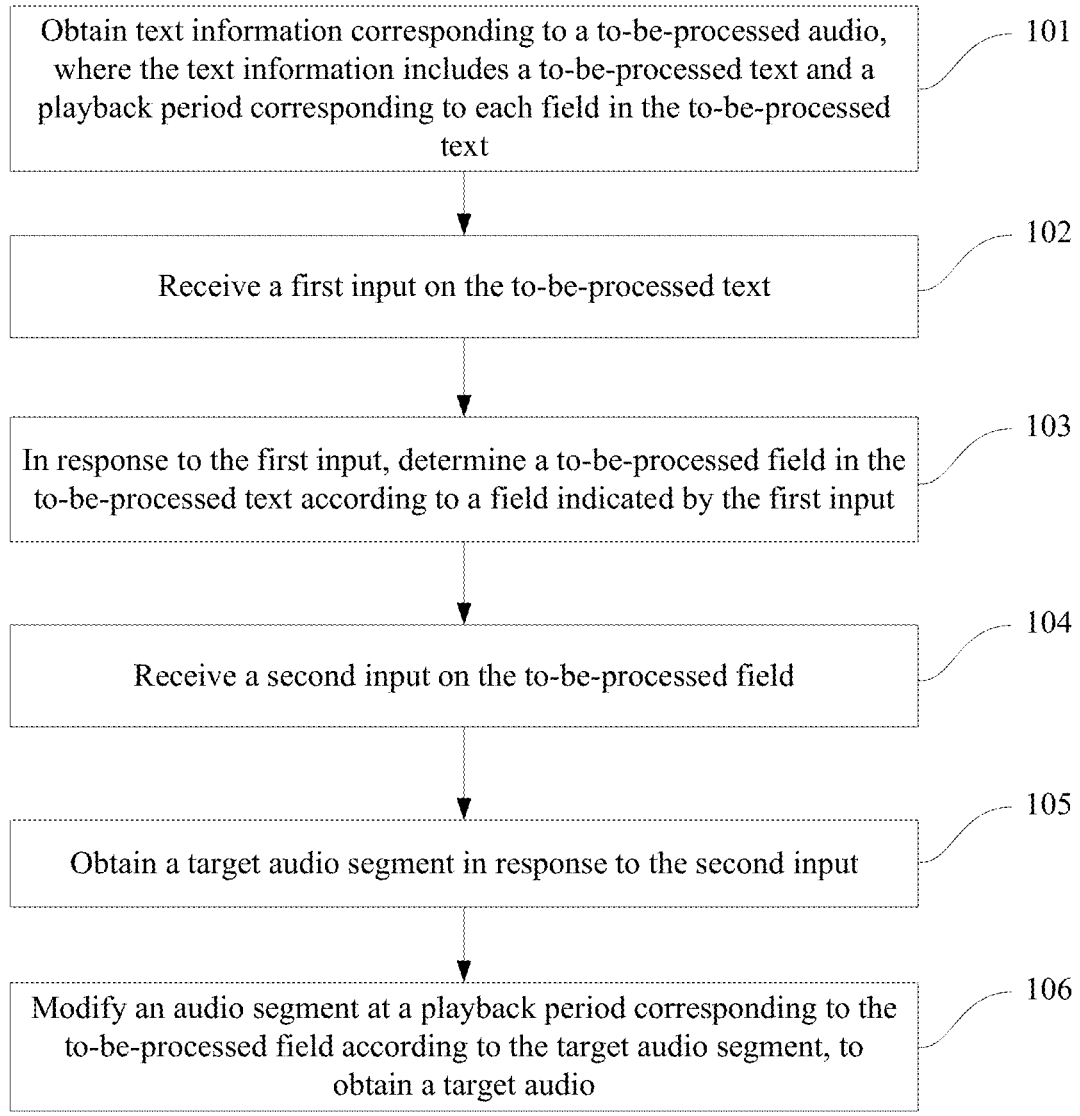
FIG. 1 is a step flowchart of an embodiment of an audio processing method according to the present disclosure.

FIG. 1 is a step flowchart of an embodiment of an audio processing method according to the present disclosure. The method may be applied to an electronic device. As shown in FIG. 1, the method may include step 101 to step 106.

Step 101: Obtain text information corresponding to a to-be-processed audio, where the text information includes a to-be-processed text and a playback period corresponding to each field in the to-be-processed text.

In this embodiment of the present disclosure, the to-be-processed audio may be locally stored audio, or may be audio that needs to be modified and that is downloaded from the Internet. The to-be-processed audio may be directly obtained by recording audio, or may be recorded in a video recording process, that is, the to-be-processed audio may be audio extracted from a video. Further, the to-be-processed text may be a text corresponding to the to-be-processed audio, and the corresponding text may be obtained by converting the to-be-processed audio by using a voice-to-text method. The playback period corresponding to each field in the to-be-processed text may be a corresponding playback period of audio corresponding to the field in the to-be-processed audio. For example, assuming that a corresponding playback period of audio corresponding to a field "good mood" in the to-be-processed text in the to-be-processed audio is the $5.1^{th}$ second to the $5.9^{th}$ second, the playback period "the $5.1^{th}$ second to the $5.9^{th}$ second" may be determined as the playback period corresponding to the field "good mood".

Step 102: Receive a first input on the to-be-processed text.

In this embodiment of the present disclosure, the first input on the to-be-processed text may be an operation of selecting a field that needs to be modified in the to-be-processed text on an interface on which the to-be-processed text is displayed. This operation may be a single tap or a double-tap.

Step 103: In response to the first input, determine a to-be-processed field in the to-be-processed text according to a field indicated by the first input.

In this embodiment of the present disclosure, the field indicated by the first input is a field selected by a user through the first input, that is, a field corresponding to audio that needs to be modified by the user. Therefore, the to-be-processed field may be determined according to the field indicated by the first input. When the to-be-processed field in the to-be-processed text is determined according to the field indicated by the first input, the field indicated by the first input in the to-be-processed text may be used as the to-be-processed field.

Step 104: Receive a second input on the to-be-processed field.

In this embodiment of the present disclosure, the second input on the to-be-processed field may be performed on the interface on which the to-be-processed text is displayed, and the second input may be performed by the user according to a modification requirement for an audio segment corresponding to the to-be-processed field. For example, the second input may be a delete operation on the to-be-processed field, or an input operation for replacing the to-be-processed field, or an operation used to input a field that needs to be added, or an input operation for replacing the audio segment corresponding to the to-be-processed field.

Step 105: Obtain a target audio segment in response to the second input.

In this embodiment of the present disclosure, the target audio segment may be an audio segment that the user finally wants. The target audio segment may be directly input by the user, or may be obtained by an electronic device by editing the to-be-processed field. A specific manner of editing the to-be-processed field may be determined according to the second input. For example, when the second input is an operation of inputting a field that needs to be added, a new field may be added to the to-be-processed field. When the second input is a delete operation on the to-be-processed field, the to-be-processed field is deleted, and the like. The second input is performed by the user according to the modification requirement for the audio segment corresponding to the to-be-processed field. Therefore, the to-be-processed field is edited, so that it can be ensured that the obtained target audio segment is a field corresponding to audio that the user finally wants.

Step 106: Modify an audio segment at a playback period corresponding to the to-be-processed field according to the target audio segment, to obtain a target audio.

In this embodiment of the present disclosure, when modification is performed according to the target audio segment, the playback period corresponding to the to-be-processed field may be read from the playback period corresponding to each field included in the text information, and then the audio segment at the playback period corresponding to the to-be-processed field is modified into the target audio segment, thereby implementing modification of the to-be-processed audio.

In view of the above, according to the audio processing method provided in this embodiment of the present disclosure, text information corresponding to a to-be-processed audio is obtained, where the text information includes a to-be-processed text and a playback period corresponding to each field in the to-be-processed text; then a first input on the to-be-processed text is received; in response to the first input, a to-be-processed field in the to-be-processed text is determined according to a field indicated by the first input; then a second input on the to-be-processed field is received; a target audio segment is obtained in response to the second input; and finally an audio segment at a playback period corresponding to the to-be-processed field is modified according to the target audio segment, to obtain a target audio. In this way, audio can be modified without manually adjusting a progress bar, thereby improving audio processing efficiency.

Figures 1, 2:
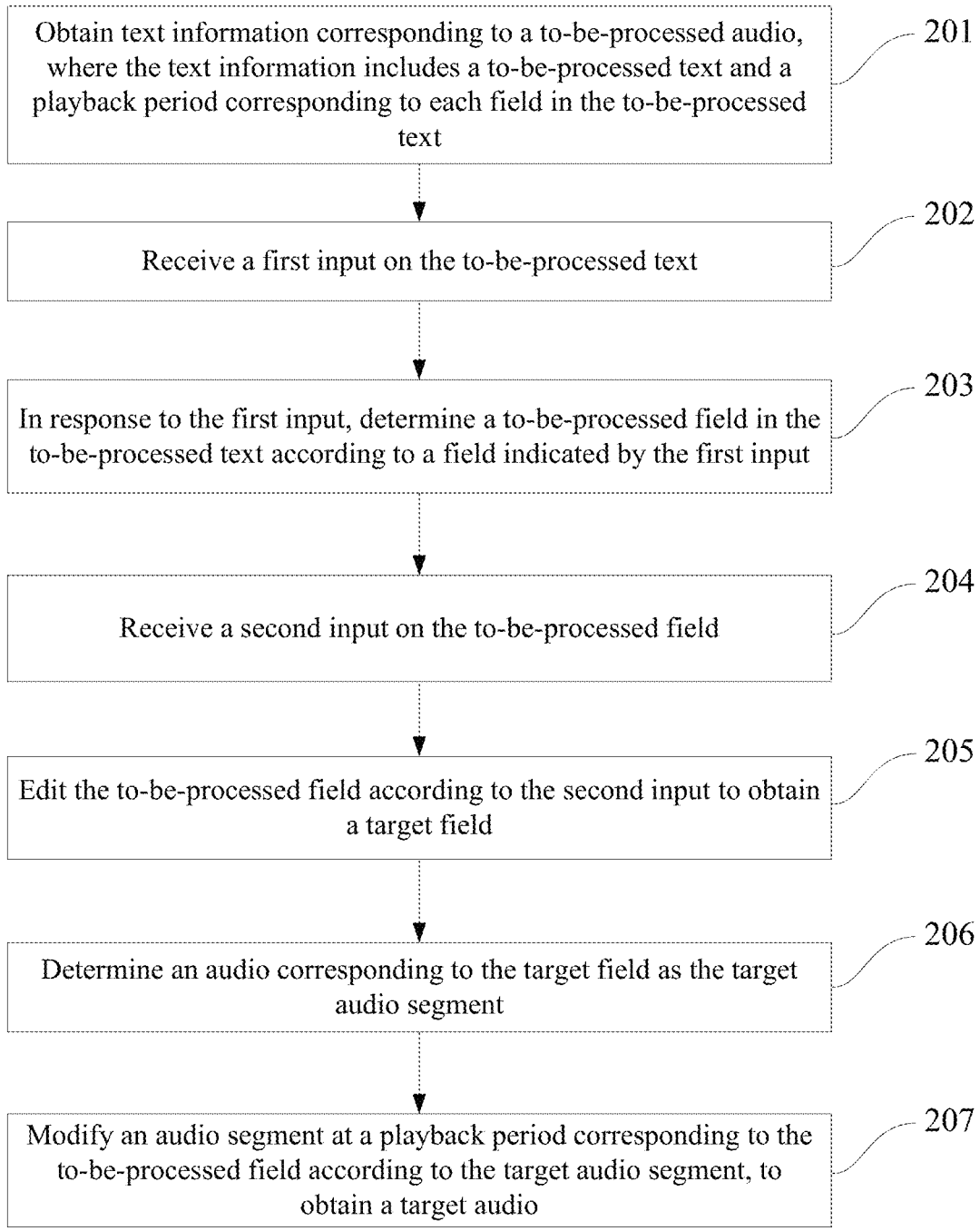

FIG. 2-1 is a step flowchart of another embodiment of an audio processing method according to the present disclosure. The method may be applied to an electronic device. As shown in FIG. 2-1, the method may include step 201 to step 207.

Step 201: Obtain text information corresponding to a to-be-processed audio, where the text information includes a to-be-processed text and a playback period corresponding to each field in the to-be-processed text.

In this embodiment of the present disclosure, the electronic device may obtain the text information corresponding to the to-be-processed audio by performing the following step 2011 to step 2013.

Step 2011: Detect whether a subtitle file matching the to-be-processed audio exists, where the subtitle file includes a subtitle text and a playback period corresponding to each field in the subtitle text.

In this embodiment of the present disclosure, the to-be-processed audio may be audio in a video, and correspondingly, the subtitle file may be a subtitle file matching the video. The to-be-processed audio may also be independent audio such as a song, and correspondingly, the subtitle file may be a lyric file matching the song. The detecting whether a subtitle file matching the to-be-processed audio exists may be searching for whether the subtitle file matching the to-be-processed audio online exists, or locally searching for whether the matched subtitle file exists.

Step 2012: If the subtitle file matching the to-be-processed audio exists, use the subtitle file as the text information corresponding to the to-be-processed audio.

In this embodiment of the present disclosure, the using the subtitle file as the text information corresponding to the to-be-processed audio may be using a subtitle text included in the subtitle file as the to-be-processed text corresponding to the to-be-processed audio, and using a playback period corresponding to each field in the subtitle text as a playback period of the field in the to-be-processed audio. It is detected whether the matched subtitle file exists, and in a case that the subtitle file exists, the subtitle file is used as the text information corresponding to the to-be-processed audio. In this way, a step of generating a text according to audio may be omitted, and an audio processing time is further saved to some extent.

Step 2013: If the subtitle file matching the to-be-processed audio does not exist, convert an audio included in the to-be-processed audio into a text, generate a playback period corresponding to each field in the text according to playback time information of an audio segment in the to-be-processed audio, and use the text and the playback period corresponding to each field in the text as the text information corresponding to the to-be-processed audio.

In this embodiment of the present disclosure, the to-be-processed audio may be converted into a text by using a voice-to-text method. Alternatively, the audio may be processed first to remove a noise in the audio, thereby avoid causing interference to the conversion process. Then, a feature value in the audio is extracted, and the audio is divided into a smaller audio segment, so that the audio segment includes one or more feature values. Matching is performed on a model feature value in an audio model library according to the feature value in the audio segment, and a text corresponding to the model feature value obtained through the matching is determined as a text corresponding to the audio segment. The generating a playback period corresponding to each field in the text may be reading a playback period corresponding to a to-be-divided audio segment in a process of converting audio into a text, and then using the playback period corresponding to the to-be-divided audio segment as a playback period corresponding to the field. In this way, when the subtitle file does not exist, the corresponding text is generated by using the audio, to obtain text content matching the to-be-processed audio, thereby ensuring that accurate text information can be subsequently provided.

Step 202: Receive a first input on the to-be-processed text.

In this embodiment of the present disclosure, before the first input on the to-be-processed text is received, the to-be-processed text may be displayed by performing the following step:

displaying a preset picture, and displaying all to-be-processed texts in the preset picture; or displaying each video picture of the to-be-processed video, and displaying a to-be-processed text corresponding to the video picture in the video picture.

Alternatively, the preset picture may be preset according to an actual situation. For example, the preset picture may be a picture associated with the to-be-processed audio. For example, the preset picture may be a video cover of a video to which the to-be-processed audio belongs, or a cover of an audio album to which the to-be-processed audio belongs, or a photo of a singer of the to-be-processed audio. This is not limited in this embodiment of the present disclosure. Further, all to-be-processed texts are displayed in the preset picture, so that the user can visually view all the to-be-processed texts. Meanwhile, a preset picture related to the to-be-processed text is used, so that viewing experience of the user can be improved. For example, FIG. 2-2 is a schematic diagram of an example of displaying a to-be-processed text according to an embodiment of the present disclosure. As shown in FIG. 2-2, all to-be-processed texts are displayed in a related picture of a singer that sings a to-be-processed audio. It should be noted that in an actual application scenario, there may be many to-be-processed texts, and due to a limitation of a screen size of the electronic device, all to-be-processed texts may not be displayed at once. Therefore, scrolling display may be performed on the to-be-processed texts to ensure complete display.

Figures 2, 3, 4:
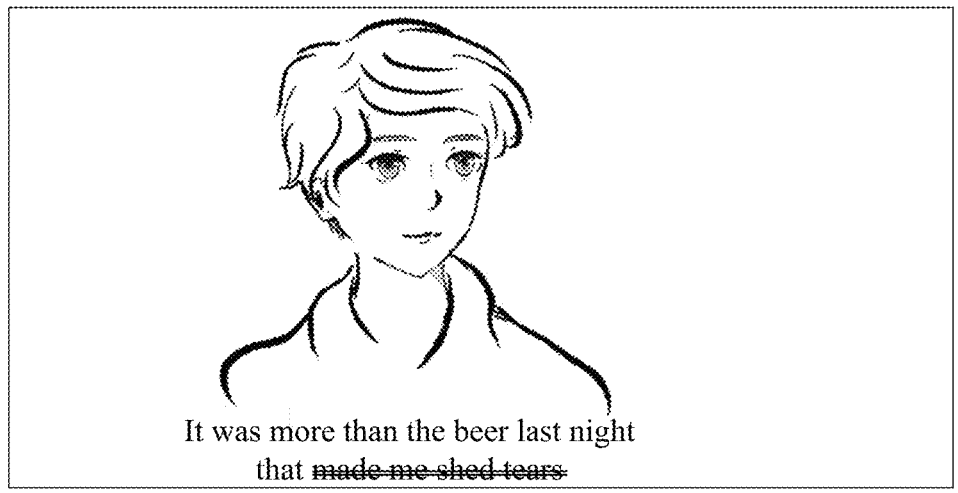

Further, the video picture may be displayed, and the corresponding to-be-processed text is displayed in the video picture. The to-be-processed text corresponding to the video picture may be a text whose playback period is the same as a playback period of the video picture. Content of the video picture is usually strongly associated with the to-be-processed text corresponding to the video picture. Therefore, in separate display in the video picture, it is convenient for the user to observe both content and text content of the video picture, thereby facilitating the user to select. Alternatively, a text display box may be generated on the video picture, and the to-be-processed text is displayed in the text display box. A specific form of the display box may be preset according to an actual situation. For example, FIG. 2-3 is a schematic diagram of another example of displaying a to-be-processed text according to an embodiment of the present disclosure. As shown in FIG. 2-3, the corresponding to-be-processed text is displayed in the video picture, that is, "It was more than the beer last night that made me shed tears".

Correspondingly, the electronic device may receive the first input by receiving a select input on the displayed to-be-processed text. In this way, the to-be-processed text is displayed in the preset picture or the video picture, so that the user can be provided with a visual selection scenario and rich information, and the user can conveniently select the to-be-processed text, thereby improving selection efficiency.

Step 203: In response to the first input, determine a to-be-processed field in the to-be-processed text according to a field indicated by the first input.

Alternatively, when the field indicated by the first input in the to-be-processed text is determined as the to-be-processed field, all to-be-processed texts may be searched for fields indicated by all included first inputs, and then a searched field is determined as the to-be-processed field. The field indicated by the first input may be a field selected by the user for the select input on the displayed to-be-processed text. Alternatively, the first input may be performed by using a preset search area, and the field indicated by the first input may be input by using the search area. Correspondingly, the electronic device may display the search area before this step, and then receive the first input performed by the user by using the search area. In this way, the user needs to select only once to control the electronic device to modify all same fields, thereby improving selection efficiency.

Further, after step 203 is performed, an audio volume may be adjusted by performing the following step A to step C.

Step A: Receive a third input on the to-be-processed text.

In this embodiment of the present disclosure, the third input on the to-be-processed text may be performed on the interface on which the to-be-processed text is displayed, and the third input may be an adjustment operation on a font of the to-be-processed text. The user may perform the third input when the font of the to-be-processed text needs to be adjusted, and correspondingly, the electronic device may receive the third input.

Step B: In response to the third input, adjust a font size of a to-be-adjusted field indicated by the third input, to obtain an adjusted to-be-adjusted field.

In this embodiment of the present disclosure, the adjusting a font size of a to-be-adjusted field indicated by the third input may be enlarging or narrowing the font size of the to-be-adjusted field according to the adjustment operation indicated by the third input, to obtain the adjusted to-be-adjusted field.

Step C: Adjust a volume level of an audio corresponding to the to-be-adjusted field according to a font size of the adjusted to-be-adjusted field, where a larger font of the adjusted to-be-adjusted field indicates a larger volume of the audio corresponding to the to-be-adjusted field.

In this embodiment of the present disclosure, the adjusting a volume level of an audio corresponding to the to-be-adjusted field according to a font size of the adjusted to-be-adjusted field may be first determining the font size of the adjusted to-be-adjusted field, then determining a volume corresponding to the font size of the adjusted to-be-adjusted field according to a preset correspondence between a font size and a volume level, and finally setting the volume level of the audio corresponding to the to-be-adjusted field as a volume of the audio corresponding to the to-be-adjusted field, thereby implementing volume adjustment. In the preset correspondence between a font size and a volume level, a larger font indicates a larger volume.

For example, it is assumed that the font size of the adjusted to-be-adjusted field is 4 pt, and a volume corresponding to the font size 4 pt is 60 decibels. Correspondingly, the volume level of the audio corresponding to the to-be-adjusted field may be set to 60 decibels. In this way, the user only needs to adjust a font size of a text to correspondingly control adjustment of a volume level of corresponding audio, so that an audio volume adjustment process is simpler, thereby improving adjustment efficiency.

Further, in this embodiment of the present disclosure, a curve used to adjust a font size may be preset. Correspondingly, the user may select, from the to-be-processed text, the to-be-adjusted field whose font size needs to be adjusted, and then adjust a shape of the curve, thereby implementing the second input. Further, when the font size is adjusted, a size of each word included in the to-be-adjusted field may be successively adjusted according to a height of each segment of an adjusted curve. The height of the segment may be directly proportional or inversely proportional to the size of the word. In this way, the user only needs to adjust the shape of the curve to adjust a volume level of a corresponding audio segment. In addition, due to a variety of shapes of the curve, the volume level of the audio segment corresponding to the to-be-processed field may vary. For example, the user may adjust the curve to a wave shape to control a volume corresponding to the to-be-adjusted field to increase or decrease, thereby improving fun of the audio.

Step 204: Receive a second input on the to-be-processed field.

Alternatively, for an implementation of this step, refer to the foregoing step 104. This is not limited in this embodiment of the present disclosure.

Step 205: Edit the to-be-processed field according to the second input to obtain a target field.

In this embodiment of the present disclosure, if the second input is a delete input, it may be considered that the user needs to delete the to-be-processed field. Therefore, the to-be-processed field may be deleted, and a blank field obtained after the deletion is determined as the target field.

Further, if the second input is a replace input, it may be considered that the user needs to replace the to-be-processed field. Therefore, a to-be-replaced field corresponding to the second input may be obtained, the to-be-processed field is deleted, and the to-be-replaced field is added at a location of the to-be-processed field to obtain the target field. The obtaining a to-be-replaced field corresponding to the second input may be extracting a field included in the second input, and using the field as the to-be-replaced field, or extracting a voice included in the second input, obtaining a text corresponding to the voice by using a voice-to-text method, and using the obtained text as the to-be-replaced field.

Further, if the second input is an add input, it may be considered that the user needs to add a new filed to the to-be-processed field. Therefore, a to-be-added field corresponding to the second input may be obtained, and the to-be-added field is added at a location of the to-be-processed field to obtain the target field. In this embodiment of the present disclosure, the obtaining a to-be-added field corresponding to the second input may be extracting a field included in the second input, and using the field as the to-be-added field, or extracting a voice included in the second input, obtaining a text corresponding to the voice by using a voice-to-text method, and using the obtained text as the to-be-added field. In this embodiment of the present disclosure, corresponding edit operations can be performed according to different second inputs, thereby satisfying a plurality of modification requirements of the user and improving an audio modification effect.

It should be noted that a preset mark may be further added to the displayed to-be-processed field, and the to-be-replaced field or the to-be-added field is displayed according to a display location corresponding to the to-be-processed field. Alternatively, the preset mark may be a mark that reflects a specific edit operation performed on the to-be-processed field, and preset marks corresponding to different edit operations are different. For example, if the edit operation is to delete the to-be-processed field, the preset mark may be a delete line added to the to-be-processed field, or may be a text mark added to the to-be-processed field to indicate that the field is deleted. If the edit operation is to replace the to-be-processed field, the preset mark may be an underline added to the to-be-processed field, or may be a text mark added to the to-be-processed field to indicate that the field is replaced, and the to-be-replaced field is displayed next to the to-be-processed field. A specific display location may be set according to an actual situation. If the edit operation is to add a field at the location of the to-be-processed field, the preset mark may be to add a field mark, such as an arrow, at the location corresponding to the to-be-processed field, to instruct to add a field at the location. In addition, the added to-be-added field may be displayed, so that the user learns a specific added field. There may be a plurality of specific mark manners. This is not limited in this embodiment of the present disclosure. The preset mark is added to the to-be-processed field, so that the user can learn more clearly the location of the to-be-processed field that is modified and a specific edit operation performed on the to-be-processed field.

Further, the display location may be preset according to an actual requirement. For example, the display location may be below the to-be-deleted field. In this way, the to-be-replaced field or the to-be-added field is displayed at the display location corresponding to the to-be-deleted field, so that the user can quickly learn specific modified content, and it is convenient for the user to check later.

For example, FIG. 2-4 is a schematic diagram of an example of editing a to-be-processed text according to an embodiment of the present disclosure. As shown in FIG. 2-4, if the to-be-processed field is "made me shed tears" and the second input is a delete input, the to-be-processed field is deleted, that is, a delete line is added to "made me shed tears" for deletion.

FIG. 2-5 is a schematic diagram of another example of editing a to-be-processed text according to an embodiment of the present disclosure. As shown in FIG. 2-5, if the to-be-processed field is "tears", and the second input is a replace input, the to-be-processed field is deleted and a to-be-replaced field is displayed, that is, a delete line is added to "tears", and "saliva" under the to-be-processed field is the to-be-replaced field.

FIG. 2-6 is a schematic diagram of still another example of editing a to-be-processed text according to an embodiment of the present disclosure. As shown in FIG. 2-6, if a location indicated by the to-be-processed field is between "me" and "shed", and the second input is an add input, an arrow is used to indicate the location of the to-be-processed field, and "today" under the arrow is a to-be-added field.

Step 206: Determine an audio corresponding to the target field as the target audio segment Alternatively, a linguistic analysis may be first performed on a text to divide the target field into words, and then an audio waveform segment corresponding to a matched field is extracted from a voice synthesis library according to the words obtained through division, and an audio waveform segment corresponding to each word is synthesized to obtain an audio segment corresponding to the text. Alternatively, the to-be-processed audio may be searched to determine whether a field that is the same as the target field exits. If yes, an audio segment corresponding to the same field is extracted as the audio corresponding to the target field, to obtain the target audio segment.

Step 207: Modify an audio segment at a playback period corresponding to the to-be-processed field according to the target audio segment, to obtain a target audio.

Alternatively, in this step, the playback period corresponding to a to-be-processed field may be first obtained from the playback period corresponding to each field, then an audio waveform graph corresponding to the to-be-processed audio is obtained, and finally a corresponding wave band of the playback period corresponding to the to-be-processed field in the audio waveform graph is modified into an audio wave band corresponding to the target audio segment to obtain the target audio.

When the playback period corresponding to the to-be-processed field is obtained, each field may be searched for the to-be-processed field, and then the playback period corresponding to the to-be-processed field is read. When the audio waveform graph corresponding to the to-be-processed audio is obtained, a feature included in the audio may be extracted, for example, a vibration frequency, to process the feature, for example, normalized processing, to obtain a waveform graph for displaying an audio feature according a playback time.

Further, when the corresponding wave band of the playback period corresponding to the to-be-processed field in the audio waveform graph is modified into a blank wave band corresponding to the target audio segment, the blank wave band may be used to replace the corresponding wave band to implement modification. Alternatively, the corresponding wave band may be directly deleted to implement modification. It should be noted that, waveform display of the corresponding wave band may be removed during the deletion, and changed to straight line display, to indicate that a sound is deleted.

If the target field is a to-be-replaced field, the corresponding wave band may be directly replaced with the audio wave band corresponding to the target audio segment, or the corresponding wave band may be first deleted, and then an audio wave band corresponding to the to-be-replaced field in the audio wave band corresponding to the target audio segment is added at a deletion location. If the target field is a to-be-added field, the corresponding wave band may be directly replaced with the audio wave band corresponding to the target audio segment, or an audio wave band corresponding to the to-be-added field in the audio wave band corresponding to the target audio segment may be added according to a location of the playback period corresponding to the to-be-processed field in the corresponding wave band in the audio waveform graph, and an audio wave band obtained through synthesis is used as the target audio. In this way, the wave band of the to-be-processed audio is correspondingly modified in the audio waveform graph, to implement modification of the to-be-processed audio, so that a modification process is more accurate, thereby improving modification accuracy.

It should be noted that the electronic device may further perform the following operations after obtaining the audio waveform graph:

displaying the audio waveform graph corresponding to the to-be-processed audio; and marking the corresponding wave band of the playback period corresponding to the to-be-processed field in the audio waveform graph. The marking may be filling the corresponding wave band with different colors, or may be adding a mark at a location of the corresponding wave band. A specific marking form is not limited in this embodiment of the present disclosure. In this way, the audio waveform graph corresponding to the to-be-processed audio is displayed, and the wave band corresponding to the to-be-processed field is marked in the audio waveform graph, so that the user can conveniently view a modified audio wave band.

It should be noted that before the audio wave band is modified, the to-be-processed audio may be further processed to separate a human voice from a background voice in the to-be-processed audio, and then the human voice in the to-be-processed audio is extracted, and an audio wave band corresponding to the human voice is correspondingly modified. Finally, the modified human voice and the background voice are synthesized to obtain a target audio. In this way, the background voice in the audio can be reserved only for modification of the human voice, thereby greatly reducing a degree of modification of the audio. In this way, the modified audio is more natural and coherent.

In view of the above, according to the audio processing method provided in this embodiment of the present disclosure, text information corresponding to a to-be-processed audio is obtained, where the text information includes a to-be-processed text and a playback period corresponding to each field in the to-be-processed text; then a first input on the to-be-processed text is received; in response to the first input, a to-be-processed field in the to-be-processed text is determined according to a field indicated by the first input; then a second input on the to-be-processed field is received; the to-be-processed field is edited according to the second input to obtain a target field, and an audio corresponding to the target field is determined as a target audio segment; and finally an audio segment at a playback period corresponding to the to-be-processed field is modified according to the target audio segment, to obtain a target audio. In this way, corresponding edit operations can be performed according to different second inputs, thereby satisfying a plurality of modification requirements of a user and improving an audio modification effect. In addition, audio can be modified without manually adjusting a progress bar by the user, thereby improving audio processing efficiency.

FIG. 3 is a step flowchart of still another embodiment of an audio processing method according to the present disclosure. The method may be applied to an electronic device. As shown in FIG. 3, the method may include step 301 to step 307.

Step 301: Obtain text information corresponding to a to-be-processed audio, where the text information includes a to-be-processed text and a playback period corresponding to each field in the to-be-processed text.

Alternatively, for an implementation of this step, refer to the foregoing step 201. This is not limited in this embodiment of the present disclosure.

Step 302: Receive a first input on the to-be-processed text.

Alternatively, for an implementation of this step, refer to the foregoing step 202. This is not limited in this embodiment of the present disclosure.

Step 303: In response to the first input, determine a to-be-processed field in the to-be-processed text according to a field indicated by the first input.

Alternatively, for an implementation of this step, refer to the foregoing step 203. This is not limited in this embodiment of the present disclosure.

Step 304: Receive a second input on the to-be-processed field.

Alternatively, for an implementation of this step, refer to the foregoing step 104. This is not limited in this embodiment of the present disclosure.

Step 305: Extract an audio segment carried in the second input.

In this embodiment of the present disclosure, the second input may be an audio record operation, and correspondingly, the audio segment carried in the second input may be a voice segment recorded by the user. The second input may also be an audio upload operation, and correspondingly, the audio segment carried in the second input may also be an audio segment selected by the user to be uploaded.

Step 306: Determine the audio segment as the target audio segment.

In this embodiment of the present disclosure, the second input is usually performed according to a modification requirement of the user for an audio segment corresponding to the to-be-processed field, that is, the audio segment carried in the second input is an audio segment that the user finally wants. Therefore, the audio segment may be directly determined as the target audio segment.

It should be noted that, in this embodiment of the present disclosure, before the input audio segment is determined as the target audio segment, the user may be prompted whether to process the input audio segment. If yes, the input audio segment is truncated according to a user operation, and an audio segment obtained through the truncation is used as the target audio segment. In this way, quality of the target audio segment can be further improved by prompting the user whether to process the input audio segment.

Step 307: Modify an audio segment at a playback period corresponding to the to-be-processed field according to the target audio segment, to obtain a target audio.

Alternatively, for an implementation of this step, refer to the foregoing step 207. This is not limited in this embodiment of the present disclosure.

In view of the above, according to the audio processing method provided in this embodiment of the present disclosure, text information corresponding to a to-be-processed audio is obtained, where the text information includes a to-be-processed text and a playback period corresponding to each field in the to-be-processed text; then a first input on the to-be-processed text is received; in response to the first input, a to-be-processed field in the to-be-processed text is determined according to a field indicated by the first input; then a second input on the to-be-processed field is received; an audio segment carried in the second input is extracted, and the audio segment is determined as a target audio segment; and finally an audio segment at a playback period corresponding to the to-be-processed field is modified according to the target audio segment, to obtain a target audio. In this way, the audio segment carried in the second input is directly extracted, so that the target audio segment can be conveniently obtained. Therefore, processing efficiency can be improved. In addition, audio can be modified without manually adjusting a progress bar by the user, thereby further improving audio processing efficiency.

The foregoing describes the audio processing method provided in the embodiments of the present disclosure, and the following describes the electronic device provided in the embodiments of the present disclosure with reference to the accompanying drawings.

Referring to FIG. 4, an embodiment of the present disclosure further provides an electronic device. As shown in FIG. 4, the electronic device 40 may include:

a first obtaining module 401, configured to obtain text information corresponding to a to-be-processed audio, where the text information includes a to-be-processed text and a playback period corresponding to each field in the to-be-processed text;

a first receiving module 402, configured to receive a first input on the to-be-processed text;

a first determining module 403, configured to: in response to the first input, determine a to-be-processed field in the to-be-processed text according to a field indicated by the first input;

a second receiving module 404, configured to receive a second input on the to-be-processed field;

a second obtaining module 405, configured to obtain a target audio segment according to the second input; and a second determining module 406, configured to modify an audio segment at a playback period corresponding to the to-be-processed field according to the target audio segment, to obtain a target audio.

In view of the above, according to the electronic device provided in this embodiment of the present disclosure, text information corresponding to a to-be-processed audio is obtained, where the text information includes a to-be-processed text and a playback period corresponding to each field in the to-be-processed text; then a first input on the to-be-processed text is received; in response to the first input, a to-be-processed field in the to-be-processed text is determined according to a field indicated by the first input; then a second input on the to-be-processed field is received; a target audio segment is obtained in response to the second input; and finally an audio segment at a playback period corresponding to the to-be-processed field is modified according to the target audio segment, to obtain a target audio. In this way, audio can be modified without manually adjusting a progress bar, thereby improving audio processing efficiency.

Optionally, the second obtaining module 405 is configured to:

edit the to-be-processed field according to the second input to obtain a target field, and determine an audio corresponding to the target field as the target audio segment; or extract an audio segment carried in the second input, and determine the audio segment as the target audio segment.

Optionally, the second obtaining module 405 is further configured to:

if the second input is a delete input, delete the to-be-processed field, and determine a blank field obtained after the deletion as the target field;

if the second input is a replace input, obtain a to-be-replaced field corresponding to the second input, deleting the to-be-processed field, and add the to-be-replaced field at a location of the to-be-processed field to obtain the target field; or if the second input is an add input, obtain a to-be-added field corresponding to the second input, and add the to-be-added field at a location of the to-be-processed field to obtain the target field.

Optionally, the electronic device 40 further includes:

a first display module, configured to: display a preset picture, and display all to-be-processed texts in the preset picture; or display each video picture of the to-be-processed video, and display a to-be-processed text corresponding to the video picture in the video picture.

The first receiving module 402 is further configured to: receive a select input on the displayed to-be-processed text.

Optionally, the electronic device 40 further includes:
a second display module, configured to: add a preset mark to the displayed to-be-processed field, and display the to-be-replaced field or the to-be-added field according to a display location corresponding to the to-be-processed field.

Optionally, the second determining module 406 is configured to:

obtain the playback period corresponding to the to-be-processed field from the playback period corresponding to each field;

obtain an audio waveform graph corresponding to the to-be-processed audio; and modify a corresponding wave band of the playback period corresponding to the to-be-processed field in the audio waveform graph into an audio wave band corresponding to the target audio segment, to obtain the target audio.

Optionally, the electronic device 40 further includes:

a third receiving module, configured to receive a third input on the to-be-processed text;

a first adjusting module, configured to: in response to the third input, adjust a font size of a to-be-adjusted field indicated by the third input, to obtain an adjusted to-be-adjusted field; and a second adjusting module, configured to adjust a volume level of an audio corresponding to the to-be-adjusted field according to a font size of the adjusted to-be-adjusted field, where a larger font of the adjusted to-be-adjusted field indicates a larger volume of the audio corresponding to the to-be-adjusted field.

Optionally, the first obtaining module 401 is configured to:

detect whether a subtitle file matching the to-be-processed audio exists, where the subtitle file includes a subtitle text and a playback period corresponding to each field in the subtitle text; and if the subtitle file matching the to-be-processed audio exists, use the subtitle file as the text information corresponding to the to-be-processed audio; or if the subtitle file matching the to-be-processed audio does not exist, convert an audio included in the to-be-processed audio into a text, generate a playback period corresponding to each field in the text according to playback time information of an audio segment in the to-be-processed audio, and use the text and the playback period corresponding to each field in the text as the text information corresponding to the to-be-processed audio.

In view of the above, according to the electronic device provided in this embodiment of the present disclosure, text information corresponding to a to-be-processed audio is obtained, where the text information includes a to-be-processed text and a playback period corresponding to each field in the to-be-processed text; then a first input on the to-be-processed text is received; in response to the first input, a to-be-processed field in the to-be-processed text is determined according to a field indicated by the first input; then a second input on the to-be-processed field is received; the to-be-processed field is edited according to the second input to obtain a target field, and an audio corresponding to the target field is determined as a target audio segment; and finally an audio segment at a playback period corresponding to the to-be-processed field is modified according to the target audio segment, to obtain a target audio. In this way, corresponding edit operations can be performed according to different second inputs, thereby satisfying a plurality of modification requirements of a user and improving an audio modification effect. In addition, audio can be modified without manually adjusting a progress bar by the user, thereby improving audio processing efficiency.

Figures 2, 3, 4, 5:
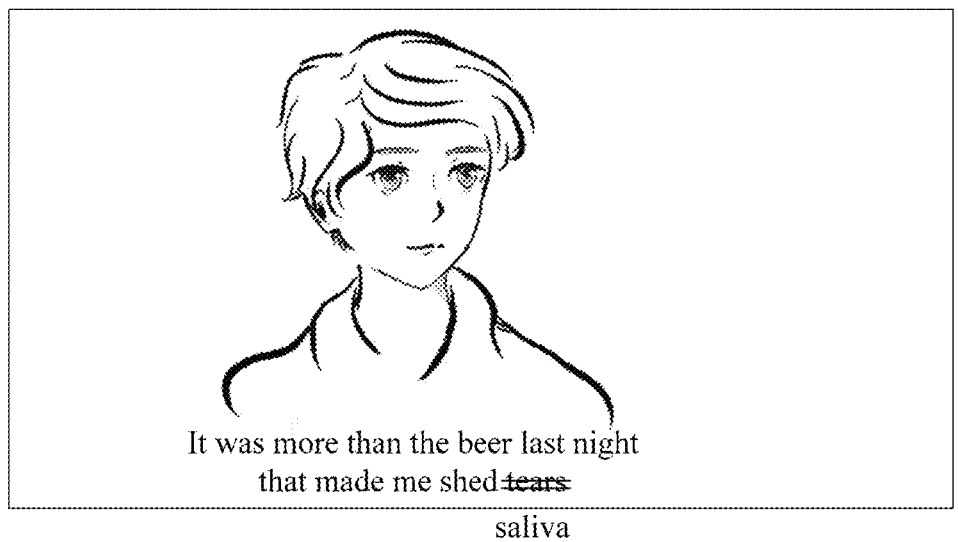
Figures 2, 3, 4, 5, 6:
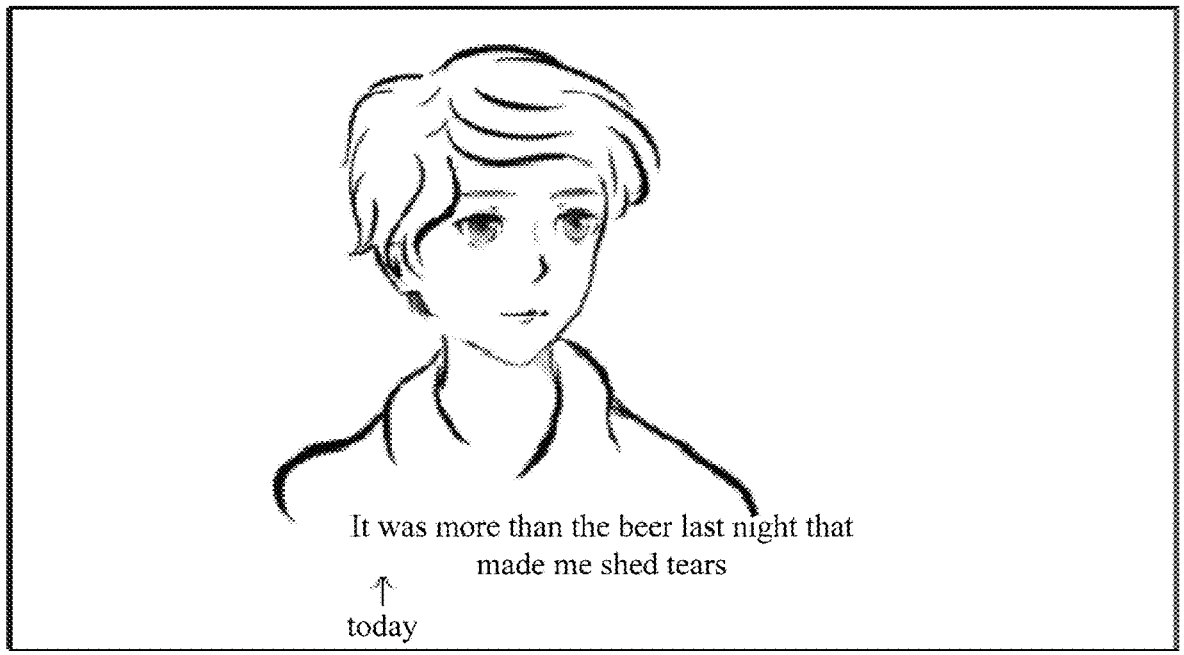
Figure 3:
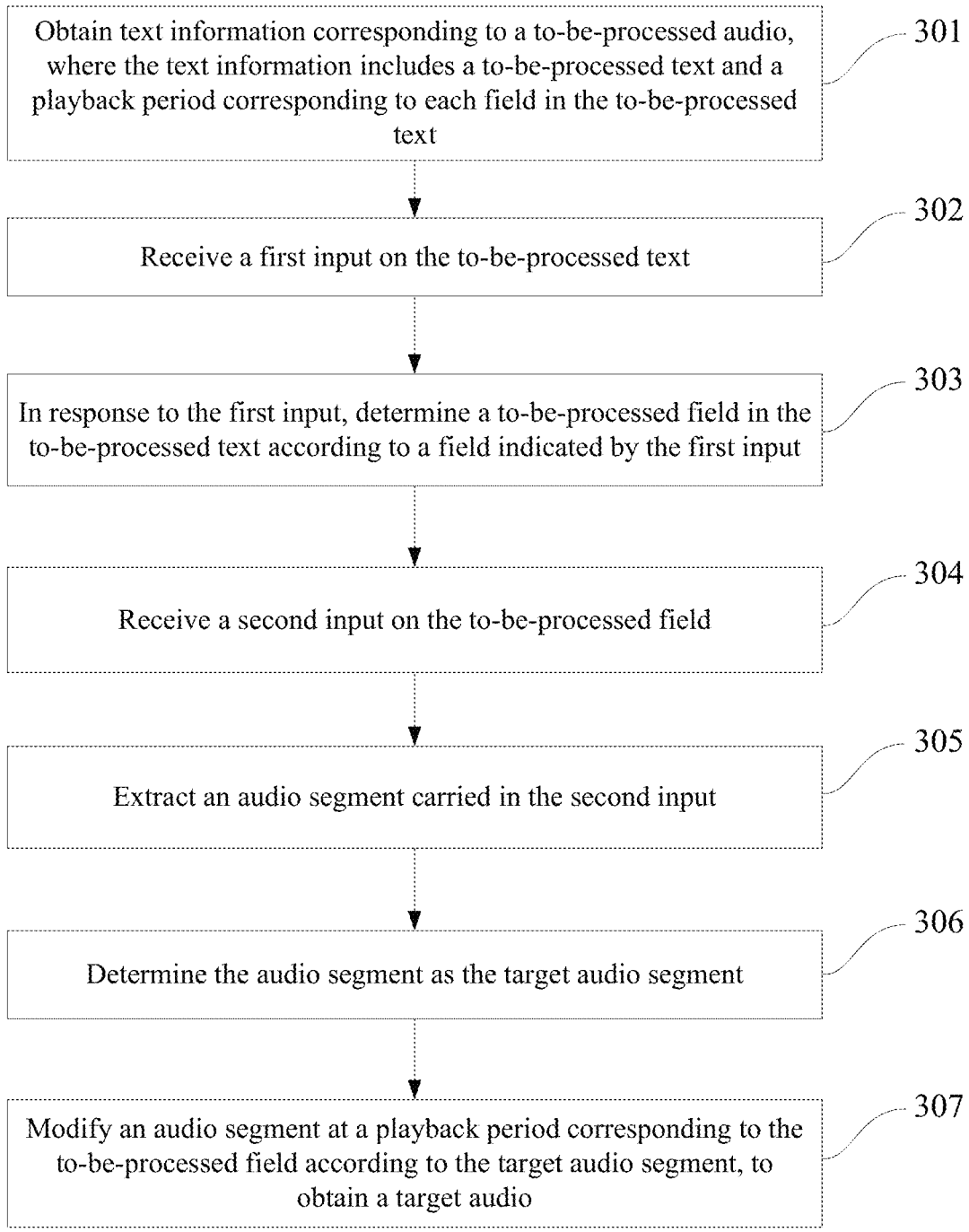
Figure 4:
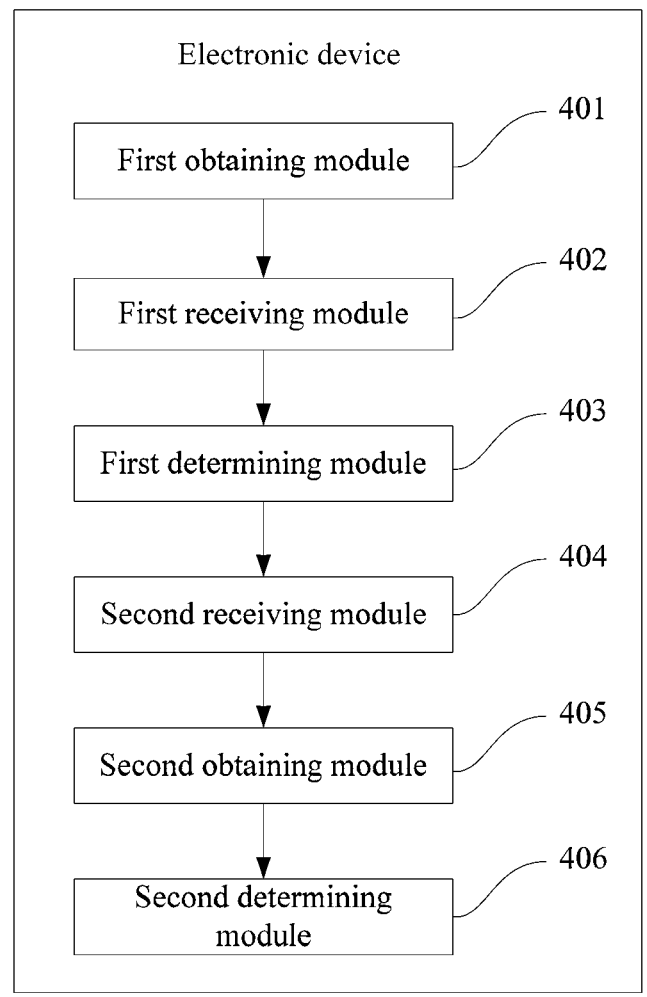
Figure 5:
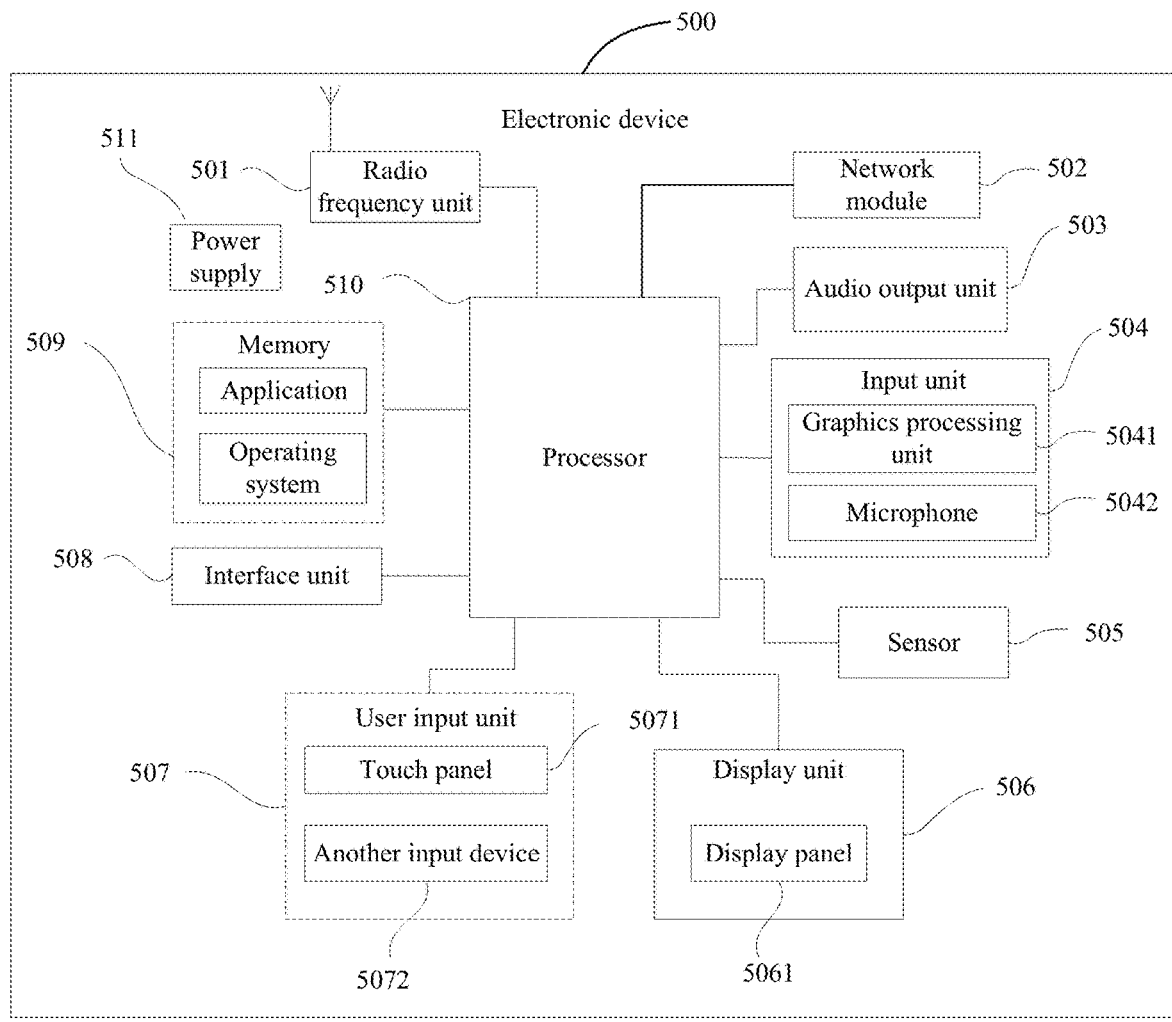

FIG. 5 is a schematic diagram of a hardware structure of an embodiment of an electronic device according to the present disclosure.

An electronic device 500 includes but is not limited to components such as a radio frequency unit 501, a network module 502, an audio output unit 503, an input unit 504, a sensor 505, a display unit 506, a user input unit 507, an interface unit 508, a memory 509, a processor 510, and a power supply 511. A person skilled in the art may understand that a structure of the electronic device shown in FIG. 5 constitutes no limitation on the electronic device, and the electronic device may include more or fewer components than those shown in the figure, or have a combination of some components, or have a different component arrangement. In this embodiment of the present disclosure, the electronic device includes but is not limited to a mobile phone, a tablet computer, a notebook computer, a palmtop computer, an in-vehicle terminal, a wearable device, a pedometer, and the like.

The processor 510 is configured to obtain text information corresponding to a to-be-processed audio, where the text information includes a to-be-processed text and a playback period corresponding to each field in the to-be-processed text.

The processor 510 is configured to receive a first input on the to-be-processed text.

The processor 510 is configured to: in response to the first input, determine a to-be-processed field in the to-be-processed text according to a field indicated by the first input.

The processor 510 is configured to receive a second input on the to-be-processed field.

The processor 510 is configured to obtain a target audio segment in response to the second input.

The processor 510 is configured to modify an audio segment at a playback period corresponding to the to-be-processed field according to the target audio segment, to obtain a target audio.

In view of the above, according to the electronic device provided in this embodiment of the present disclosure, text information corresponding to a to-be-processed audio is obtained, where the text information includes a to-be-processed text and a playback period corresponding to each field in the to-be-processed text; then a first input on the to-be-processed text is received; in response to the first input, a to-be-processed field in the to-be-processed text is determined according to a field indicated by the first input; then a second input on the to-be-processed field is received; a target audio segment is obtained in response to the second input; and finally an audio segment at a playback period corresponding to the to-be-processed field is modified according to the target audio segment, to obtain a target audio. In this way, audio can be modified without manually adjusting a progress bar, thereby improving audio processing efficiency.

Optionally, the processor 510 is configured to:
edit the to-be-processed field according to the second input to obtain a target field, and determine an audio corresponding to the target field as the target audio segment; or
extract an audio segment carried in the second input, and determine the audio segment as the target audio segment.

Optionally, the processor 510 is further configured to:
if the second input is a delete input, delete the to-be-processed field, and determine a blank field obtained after the deletion as the target field;
if the second input is a replace input, obtain a to-be-replaced field corresponding to the second input, deleting the to-be-processed field, and add the to-be-replaced field at a location of the to-be-processed field to obtain the target field; or
if the second input is an add input, obtain a to-be-added field corresponding to the second input, and add the to-be-added field at a location of the to-be-processed field to obtain the target field.

Optionally, the display unit 506 is configured to:
display a preset picture, and display all to-be-processed texts in the preset picture; or display each video picture of the to-be-processed video, and display a to-be-processed text corresponding to the video picture in the video picture.

Correspondingly, the user input unit 507 is configured to receive a select input on the displayed to-be-processed text.

Optionally, the processor 510 is configured to:
obtain the playback period corresponding to the to-be-processed field from the playback period corresponding to each field;
obtain an audio waveform graph corresponding to the to-be-processed audio; and
modify a corresponding wave band of the playback period corresponding to the to-be-processed field in the audio waveform graph into an audio wave band corresponding to the target audio segment, to obtain the target audio.

Optionally, the user input unit 507 is configured to:
receive a third input on the to-be-processed text.

The processor 510 is configured to:
in response to the third input, adjust a font size of a to-be-adjusted field indicated by the third input, to obtain an adjusted to-be-adjusted field; and
adjust a volume level of an audio corresponding to the to-be-adjusted field according to a font size of the adjusted to-be-adjusted field, where a larger font of the adjusted to-be-adjusted field indicates a larger volume of the audio corresponding to the to-be-adjusted field.

Optionally, the processor 510 is configured to:
detect whether a subtitle file matching the to-be-processed audio exists, where the subtitle file includes a subtitle text and a playback period corresponding to each field in the subtitle text; and
if the subtitle file matching the to-be-processed audio exists, use the subtitle file as the text information corresponding to the to-be-processed audio; or
if the subtitle file matching the to-be-processed audio does not exist, convert an audio included in the to-be-processed audio into a text, generate a playback period corresponding to each field in the text according to playback time information of an audio segment in the to-be-processed audio, and use the text and the playback period corresponding to each field in the text as the text information corresponding to the to-be-processed audio.

It should be understood that, in this embodiment of the present disclosure, the radio frequency unit 501 may be configured to receive and send information or a signal in a call process. Alternatively, after receiving downlink data from a base station, the radio frequency unit 501 sends the downlink data to the processor 510 for processing. In addition, the radio frequency unit 501 sends uplink data to the base station. Usually, the radio frequency unit 501 includes but is not limited to an antenna, at least one amplifier, a transceiver, a coupler, a low noise amplifier, a duplexer, and the like. In addition, the radio frequency unit 501 may communicate with a network and another device through a wireless communication system.

The electronic device provides wireless broadband Internet access for the user by using the network module 502, for example, helping the user to send and receive an e-mail, brows a web page, and access streaming media.

The audio output unit 503 may convert audio data received by the radio frequency unit 501 or the network module 502 or stored in the memory 509 into an audio signal and output the audio signal as a sound. In addition, the audio output unit 503 may further provide an audio output (for example, a call signal received voice, or a message received voice) related to a specific function implemented by the electronic device 500. The audio output unit 503 includes a speaker, a buzzer, a telephone receiver, and the like.

The input unit 504 is configured to receive an audio signal or a video signal. The input unit 504 may include a graphics processing unit (Graphics Processing Unit, GPU) 5041 and a microphone 5042, and the graphics processing unit 5041 processes image data of a still picture or video obtained by an image capture apparatus (such as a camera) in a video capture mode or an image capture mode. A processed image frame may be displayed on the display unit 506. The image frame processed by the graphics processing unit 5041 may be stored in the memory 509 (or another storage medium) or sent by using the radio frequency unit 501 or the network module 502. The microphone 5042 may receive a sound and can process such sound into audio data. Processed audio data may be converted, in a call mode, into a format that can be sent to a mobile communication base station by using the radio frequency unit 501 for output.

The electronic device 500 further includes at least one sensor 505 such as a light sensor, a motion sensor, and another sensor. Alternatively, the light sensor includes an ambient light sensor and a proximity sensor. The ambient light sensor may adjust luminance of the display panel 5061 based on brightness of ambient light. The proximity sensor may turn off the display panel 5061 and/or backlight when the electronic device 500 moves to an ear. As a type of the motion sensor, an accelerometer sensor may detect an acceleration value in each direction (generally, three axes), and detect a value and a direction of gravity when the accelerometer sensor is static, and may be used for recognizing a posture of the electronic device (such as screen switching between landscape and portrait modes, a related game, or magnetometer posture calibration), a function related to vibration recognition (such as a pedometer or a knock), and the like. The sensor 505 may further include a fingerprint sensor, a pressure sensor, an iris sensor, a molecular sensor, a gyroscope, a barometer, a hygrometer, a thermometer, an infrared sensor, and the like. Details are not described herein.

The display unit 506 is configured to display information entered by a user or information provided for a user. The display unit 606 may include a display panel 5061. The display panel 5061 may be configured in a form of a liquid crystal display (Liquid Crystal Display, LCD), an organic light-emitting diode (Organic Light-Emitting Diode, OLED), or the like.

The user input unit 507 may be configured to: receive entered digital or character information, and generate key signal input related to a user setting and function control of the electronic device. Alternatively, the user input unit 507 includes a touch panel 5071 and another input device 5072. The touch panel 5071 is also referred to as a touchscreen, and may collect a touch operation performed by a user on or near the touch panel 5071 (such as an operation performed by a user on the touch panel 5071 or near the touch panel 5071 by using any proper object or accessory, such as a finger or a stylus). The touch panel 5071 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, and sends the touch point coordinates to the processor 510, and can receive and execute a command sent by the processor 510. In addition, the touch panel 5071 may be of a resistive type, a capacitive type, an infrared type, a surface acoustic wave type, or the like. The user input unit 507 may include another input device 5072 in addition to the touch panel 5071. Alternatively, the another input device 5072 may include but is not limited to a physical keyboard, a functional button (such as a volume control button or a power on/off button), a trackball, a mouse, and a joystick. Details are not described herein.

Further, the touch panel 5071 may cover the display panel 5061. When detecting the touch operation on or near the touch panel 5071, the touch panel 5071 transmits the touch operation to the processor 510 to determine a type of a touch event, and then the processor 510 provides corresponding visual output on the display panel 5061 based on the type of the touch event. In FIG. 5, although the touch panel 5071 and the display panel 5061 are used as two independent parts to implement input and output functions of the electronic device, in some embodiments, the touch panel 5071 and the display panel 5061 may be integrated to implement the input and output functions of the electronic device. This is not specifically limited herein.

The interface unit 508 is an interface for connecting an external apparatus with the electronic device 500. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 508 may be configured to receive input (for example, data information and power) from an external apparatus and transmit the received input to one or more elements in the electronic device 500 or may be configured to transmit data between the electronic device 500 and an external apparatus.

The memory 509 may be configured to store a software program and various data. The memory 509 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 509 may include a high-speed random access memory, and may further include a nonvolatile memory, for example, at least one magnetic disk storage device, a flash storage device, or another volatile solid-state storage device.

The processor 510 is a control center of the electronic device, connects all parts of the entire electronic device by using various interfaces and lines, and performs various functions of the electronic device and data processing by running or executing a software program and/or a module that are/is stored in the memory 509 and by invoking data stored in the memory 509, to overall monitor the electronic device. The processor 510 may include one or more processing units. Preferably, an application processor and a modem processor may be integrated into the processor 510. The application processor mainly processes an operating system, a user interface, an application, and the like. The modem processor mainly processes wireless communications. It can be understood that, alternatively, the modem processor may not be integrated into the processor 510.

The electronic device 500 may further include the power supply 511 (such as a battery) that supplies power to each component. Preferably, the power supply 511 may be logically connected to the processor 510 by using a power supply management system, so as to implement functions such as charging management, discharging management, and power consumption management by using the power supply management system.

In addition, the electronic device 500 includes some function modules not shown, and details are not described herein.

Preferably, an embodiment of the present disclosure further provides an electronic device, including a processor 510, a memory 509, and an audio processing program that is stored in the memory 509 and that can be run on the processor 510. When the audio processing program is executed by the processor 510, the processes of the foregoing audio processing method embodiment are implemented and a same technical effect can be achieved. To avoid repetition, details are not described herein again.

An embodiment of the present disclosure further provides a computer-readable storage medium. The computer-readable storage medium stores an audio processing program, and when the audio processing program is executed by a processor, the processes of the foregoing audio processing method embodiment are implemented and a same technical effect can be achieved. To avoid repetition, details are not described herein again. An example of the computer-readable storage medium includes a non-transitory computer-readable storage medium, such as a read-only memory (Read-only Memory, ROM for short), a random access memory (Random Access Memory, RAM for short), a magnetic disk, or an optical disc.

The foregoing describes the aspects of the present disclosure with reference to flowcharts and/or block diagrams of the method, the apparatus (system), and the computer program product according to the embodiments of the present disclosure. It should be understood that each block in the flowchart and/or block diagram and a combination of blocks in the flowchart and/or block diagram may be implemented by a computer program instruction. These computer program instructions may be provided for a general-purpose computer, a dedicated computer, or a processor of another programmable data processing apparatus to generate a machine, so that when these instructions are executed by the computer or the processor of the another programmable data processing apparatus, specific functions/actions in one or more blocks in the flowcharts and/or in the block diagrams are implemented. The processor may be but is not limited to a general purpose processor, a dedicated processor, a special application processor, or a field programmable logic circuit. It should be further understood that each block in the block diagram or the flowchart and a combination of blocks in the block diagram or the flowchart may be implemented by using dedicated hardware that performs a specified function or operation, or may be implemented by using a combination of dedicated hardware and a computer instruction.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "including a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

The invention claimed is:

1. An audio processing method performed by an electronic device, comprising:
   obtaining text information corresponding to a to-be-processed audio, wherein the text information comprises a to-be-processed text and a playback period corresponding to each field in the to-be-processed text;
   receiving a first input on the to-be-processed text;
   in response to the first input, determining a to-be-processed field in the to-be-processed text according to a field indicated by the first input;
   receiving a second input on the to-be-processed field;
   obtaining a target audio segment according to the second input; and
   modifying an audio segment at a playback period corresponding to the to-be-processed field according to the target audio segment, to obtain a target audio,
   wherein the obtaining text information corresponding to a to-be-processed audio comprises:
   detecting whether a subtitle file matching the to-be-processed audio exists, wherein the subtitle file comprises a subtitle text and a playback period corresponding to each field in the subtitle text; and
   in a case that the subtitle file matching the to-be-processed audio exists, using the subtitle file as the text information corresponding to the to-be-processed audio; or
   in a case that the subtitle file matching the to-be-processed audio does not exist, converting an audio comprised in the to-be-processed audio into a text, generating a playback period corresponding to each field in the text according to playback time information of an audio segment in the to-be-processed audio, and using the text and the playback period corresponding to each field in the text as the text information corresponding to the to-be-processed audio.

2. The method according to claim 1, wherein the obtaining a target audio segment according to the second input comprises:
  editing the to-be-processed field according to the second input to obtain a target field, and determining an audio corresponding to the target field as the target audio segment; or
  extracting an audio segment carried in the second input, and determining the audio segment as the target audio segment.

3. The method according to claim 2, wherein the editing the to-be-processed field according to the second input to obtain a target field comprises:
  in a case that the second input is a delete input, deleting the to-be-processed field, and determining a blank field obtained after the deletion as the target field;
  in a case that the second input is a replace input, obtaining a to-be-replaced field corresponding to the second input, deleting the to-be-processed field, and adding the to-be-replaced field at a location of the to-be-processed field to obtain the target field; or
  in a case that the second input is an add input, obtaining a to-be-added field corresponding to the second input, and adding the to-be-added field at a location of the to-be-processed field to obtain the target field.

4. The method according to claim 3, wherein the to-be-processed audio is an audio comprised in a to-be-processed video; and
  before the receiving a first input on the to-be-processed text, the method further comprises:
  displaying a preset picture, and displaying all to-be-processed texts in the preset picture; or displaying each video picture of the to-be-processed video, and displaying a to-be-processed text corresponding to the video picture in the video picture; and
  the receiving a first input on the to-be-processed text comprises:
  receiving a select input on the displayed to-be-processed text.

5. The method according to claim 1, wherein the modifying an audio segment at a playback period corresponding to the to-be-processed field according to the target audio segment, to obtain a target audio comprises:
  obtaining the playback period corresponding to the to-be-processed field from the playback period corresponding to each field;
  obtaining an audio waveform graph corresponding to the to-be-processed audio; and
  modifying a corresponding wave band of the playback period corresponding to the to-be-processed field in the audio waveform graph into an audio wave band corresponding to the target audio segment, to obtain the target audio.

6. The method according to claim 1, wherein after the determining a to-be-processed field in the to-be-processed text according to a field indicated by the first input, the method further comprises:
  receiving a third input on the to-be-processed text;
  in response to the third input, adjusting a font size of a to-be-adjusted field indicated by the third input, to obtain an adjusted to-be-adjusted field; and
  adjusting a volume level of an audio corresponding to the to-be-adjusted field according to a font size of the adjusted to-be-adjusted field, wherein a larger font of the adjusted to-be-adjusted field indicates a larger volume of the audio corresponding to the to-be-adjusted field.

7. An electronic device, comprising:
  a processor; and
  a memory storing an audio processing program that is executable by the processor, wherein the audio processing program when executed by the processor, causes the electronic device to perform the following steps:
  obtaining text information corresponding to a to-be-processed audio, wherein the text information comprises a to-be-processed text and a playback period corresponding to each field in the to-be-processed text;
  receiving a first input on the to-be-processed text;
  in response to the first input, determining a to-be-processed field in the to-be-processed text according to a field indicated by the first input;
  receiving a second input on the to-be-processed field;
  obtaining a target audio segment according to the second input; and
  modifying an audio segment at a playback period corresponding to the to-be-processed field according to the target audio segment, to obtain a target audio,
  wherein the obtaining text information corresponding to a to-be-processed audio comprises:
  detecting whether a subtitle file matching the to-be-processed audio exists, wherein the subtitle file comprises a subtitle text and a playback period corresponding to each field in the subtitle text; and
  in a case that the subtitle file matching the to-be-processed audio exists, using the subtitle file as the text information corresponding to the to-be-processed audio; or
  in a case that the subtitle file matching the to-be-processed audio does not exist, converting an audio comprised in the to-be-processed audio into a text, generating a playback period corresponding to each field in the text according to playback time information of an audio segment in the to-be-processed audio, and using the text and the playback period corresponding to each field in the text as the text information corresponding to the to-be-processed audio.

8. The electronic device according to claim 7, wherein the obtaining a target audio segment according to the second input comprises:
  editing the to-be-processed field according to the second input to obtain a target field, and determining an audio corresponding to the target field as the target audio segment; or
  extracting an audio segment carried in the second input, and determining the audio segment as the target audio segment.

9. The electronic device according to claim 8, wherein the editing the to-be-processed field according to the second input to obtain a target field comprises:
  in a case that the second input is a delete input, deleting the to-be-processed field, and determining a blank field obtained after the deletion as the target field;
  in a case that the second input is a replace input, obtaining a to-be-replaced field corresponding to the second input, deleting the to-be-processed field, and adding the to-be-replaced field at a location of the to-be-processed field to obtain the target field; or in a case that the second input is an add input, obtaining a to-be-added field corresponding to the second input, and adding the to-be-added field at a location of the to-be-processed field to obtain the target field.

10. The electronic device according to claim 9, wherein the to-be-processed audio is an audio comprised in a to-be-processed video; and
before the receiving a first input on the to-be-processed text, the method further comprises:
displaying a preset picture, and displaying all to-be-processed texts in the preset picture; or displaying each video picture of the to-be-processed video, and displaying a to-be-processed text corresponding to the video picture in the video picture; and
the receiving a first input on the to-be-processed text comprises:
receiving a select input on the displayed to-be-processed text.

11. The electronic device according to claim 7, wherein the modifying an audio segment at a playback period corresponding to the to-be-processed field according to the target audio segment, to obtain a target audio comprises:
obtaining the playback period corresponding to the to-be-processed field from the playback period corresponding to each field;
obtaining an audio waveform graph corresponding to the to-be-processed audio; and
modifying a corresponding wave band of the playback period corresponding to the to-be-processed field in the audio waveform graph into an audio wave band corresponding to the target audio segment, to obtain the target audio.

12. The electronic device according to claim 7, wherein after the determining a to-be-processed field in the to-be-processed text according to a field indicated by the first input, the method further comprises:
receiving a third input on the to-be-processed text;
in response to the third input, adjusting a font size of a to-be-adjusted field indicated by the third input, to obtain an adjusted to-be-adjusted field; and
adjusting a volume level of an audio corresponding to the to-be-adjusted field according to a font size of the adjusted to-be-adjusted field, wherein a larger font of the adjusted to-be-adjusted field indicates a larger volume of the audio corresponding to the to-be-adjusted field.

13. A non-transitory computer-readable storage medium storing an audio processing program, wherein the audio processing program, when executed by a processor, performs the following steps:
obtaining text information corresponding to a to-be-processed audio, wherein the text information comprises a to-be-processed text and a playback period corresponding to each field in the to-be-processed text;
receiving a first input on the to-be-processed text;
in response to the first input, determining a to-be-processed field in the to-be-processed text according to a field indicated by the first input;
receiving a second input on the to-be-processed field;
obtaining a target audio segment according to the second input; and
modifying an audio segment at a playback period corresponding to the to-be-processed field according to the target audio segment, to obtain a target audio,
wherein the obtaining text information corresponding to a to-be-processed audio comprises:
detecting whether a subtitle file matching the to-be-processed audio exists, wherein the subtitle file comprises a subtitle text and a playback period corresponding to each field in the subtitle text; and
in a case that the subtitle file matching the to-be-processed audio exists, using the subtitle file as the text information corresponding to the to-be-processed audio; or
in a case that the subtitle file matching the to-be-processed audio does not exist, converting an audio comprised in the to-be-processed audio into a text, generating a playback period corresponding to each field in the text according to playback time information of an audio segment in the to-be-processed audio, and using the text and the playback period corresponding to each field in the text as the text information corresponding to the to-be-processed audio.

14. The non-transitory computer-readable storage medium according to claim 13, wherein the obtaining a target audio segment according to the second input comprises:
editing the to-be-processed field according to the second input to obtain a target field, and determining an audio corresponding to the target field as the target audio segment; or
extracting an audio segment carried in the second input, and determining the audio segment as the target audio segment.

15. The non-transitory computer-readable storage medium according to claim 14, wherein the editing the to-be-processed field according to the second input to obtain a target field comprises:
in a case that the second input is a delete input, deleting the to-be-processed field, and determining a blank field obtained after the deletion as the target field;
in a case that the second input is a replace input, obtaining a to-be-replaced field corresponding to the second input, deleting the to-be-processed field, and adding the to-be-replaced field at a location of the to-be-processed field to obtain the target field; or
in a case that the second input is an add input, obtaining a to-be-added field corresponding to the second input, and adding the to-be-added field at a location of the to-be-processed field to obtain the target field.

16. The non-transitory computer-readable storage medium according to claim 15, wherein the to-be-processed audio is an audio comprised in a to-be-processed video; and
before the receiving a first input on the to-be-processed text, the method further comprises:
displaying a preset picture, and displaying all to-be-processed texts in the preset picture; or displaying each video picture of the to-be-processed video, and displaying a to-be-processed text corresponding to the video picture in the video picture; and
the receiving a first input on the to-be-processed text comprises:
receiving a select input on the displayed to-be-processed text.

17. The non-transitory computer-readable storage medium according to claim 13, wherein the modifying an audio segment at a playback period corresponding to the to-be-processed field according to the target audio segment, to obtain a target audio comprises:
obtaining the playback period corresponding to the to-be-processed field from the playback period corresponding to each field;

obtaining an audio waveform graph corresponding to the to-be-processed audio; and modifying a corresponding wave band of the playback period corresponding to the to-be-processed field in the audio waveform graph into an audio wave band corresponding to the target audio segment, to obtain the target audio.

18. The non-transitory computer-readable storage medium according to claim 13, wherein after the determining a to-be-processed field in the to-be-processed text according to a field indicated by the first input, the method further comprises:

receiving a third input on the to-be-processed text;

in response to the third input, adjusting a font size of a to-be-adjusted field indicated by the third input, to obtain an adjusted to-be-adjusted field; and adjusting a volume level of an audio corresponding to the to-be-adjusted field according to a font size of the adjusted to-be-adjusted field, wherein a larger font of the adjusted to-be-adjusted field indicates a larger volume of the audio corresponding to the to-be-adjusted field.

* * * * *